United States Patent [19]

Fitzgerald et al.

[11] Patent Number: 5,791,460
[45] Date of Patent: Aug. 11, 1998

[54] EYE-GLASSES HOLDER ESPECIALLY FOR USE IN VEHICLES

[76] Inventors: Scott P. Fitzgerald; Timothy C. Fitzgerald, both of 2644 Wordsworth Ct., Thousand Oaks, Calif. 91362

[21] Appl. No.: 795,776

[22] Filed: Feb. 5, 1997

[51] Int. Cl.⁶ ................................. A45C 11/04
[52] U.S. Cl. ................................. 206/5
[58] Field of Search .......... 206/5, 6, 362.1, 206/362.2, 15.2, 15.3; 220/254

[56] References Cited

U.S. PATENT DOCUMENTS

| | | | |
|---|---|---|---|
| 2,533,355 | 12/1950 | Comfort | 206/15.3 |
| 4,782,941 | 11/1988 | Freise | 206/5 |
| 5,151,778 | 9/1992 | Conley | 206/5 |
| 5,188,322 | 2/1993 | Kinstrey | 206/5 |
| 5,513,744 | 5/1996 | Yabarra | 206/6 |
| 5,526,924 | 6/1996 | Klutznick | 206/5 |
| 5,626,224 | 5/1997 | Clark et al. | 206/5 |

*Primary Examiner*—Paul T. Sewell
*Assistant Examiner*—Luan K. Bui
*Attorney, Agent, or Firm*—Leonard Tachner

[57] ABSTRACT

A holder for temporary storage of eye-glasses particularly in a vehicle, comprises an elongated hollow cylinder made of a rubber-like, soft resilient material. A rectangular slot at one end of the cylinder is adjacent a plurality of straight die cuts forming a plurality of deformable fingers. These fingers effectively grasp an end of the folded eye-glasses physically isolating and protecting the eye-glasses which sit, predominantly in the interior of the cylinder. The cylinder is preferably dimensioned to fit standard cup holders used in vehicles.

8 Claims, 3 Drawing Sheets

EYE-GLASSES HOLDER ESPECIALLY FOR USE IN VEHICLES

BACKGROUND OF THE INVENTION

1. Field of the Invention

The present invention relates generally to eye-glasses holders and more particularly, to a protective eye-glasses holder which provides an extremely protective environment for inserted eye-glasses and which is especially suited for use in conjunction with drinking cup holders such as those found inside vehicles.

2. Prior Art

Finding a safer location for eye-glasses is a constant challenge. Eye-glasses are inherently delicate and easily broken or bent or otherwise damaged when subjected to even slight forces. This problem is especially acute in vehicles where loose eye-glasses may be thrown around by movement of the vehicle, or may be sat upon or otherwise subjected to damaging forces. Various prior art eye-glass holders have been designed. However, none is especially suitable for stabilizing eye-glasses in a vehicle.

A search of prior art patents has revealed the following United States patents:

```
DES. 246,657    Mende
DES. 348,475    Kahari
2,650,700       Wolf
3,150,406       Obitts
3,559,798       Jacobsen
4,267,923       Baratelli et al
4,949,432       Wisniewski
4,984,682       Cummins
5,188,322       Kinstrey
5,344,002       Baczkowski
5,423,419       Wentz et al
5,491,878       Janouschek
5,513,744       Yabarra
```

U.S. Pat. No. 5,188,322 to Kinstrey is directed to an eyeglass holder made from a foam-backed fabric lining in a coffee mug. A liner 20 made from a quilted foam-backed fabric 31 is cut and sewn to fit a coffee mug 15 with edge 21 folded over the edge of the mug. The liner is removably held by Velcro fasteners with adhesive tabs to the mug. The foam-backed quilted fabric liner protects the lenses 24, 25 from being scratched and soiled when placed in the mug for storage.

U.S. Pat. No. 3,559,798 to Jacobsen is directed to an eyeglass case made from a sheet of flexible closed cell elastomeric material that will float. The eyeglass case 10 formed from a blank of sheet material 11, folded in the middle and seamed with one end left unseamed, forms opening 16. The sheet material can be any number of elastomeric materials such as polychloraprene. The resilient elastomeric material provides for holding the glasses in the case, cushioning the eyeglasses from shock when dropped, and provides for the glasses and case to float indefinitely if dropped in the water.

U.S. Pat. No. 2,650,700 to Wolf is directed to a cushioned eyeglass case formed with a flexible outer case in an interior cushion in several variations. The case 20 has an outer covering sheet 22 of thin pliable material and an interior cushioning layer 24 of foam or sponge rubber. The interior of the cushioning layer is lined with a cotton flannel or cotton felt.

U.S. Pat. No. 5,423,419 to Wentz et al is directed to a waterproof floating eyeglass case. The hollow case has a lower part 12 with a gasket 26 in a groove 24 in the thickened upper rim 29. The hinged cover 14 seals against the gasket, providing a waterproof case. The cover and lower part have a felt coated fabric liner 76, 77 to provide a scratch-free surface to protect the lenses and frames. Sponge rubber pads 78, 79 are provided in the very top and bottom for the ends of the glasses to embed themselves to be held securely.

U.S. Pat. No. 4,267,923 to Baratelli et al is directed to an open end eyeglass case having a separator element to prevent the temple tips from contacting the lenses. The case 10 can have rigid or soft side walls 13, 14. A flexible separating element 21 is installed to prevent the temple tips from contacting the lenses. The separating element may be covered with flocking or some other soft material to help protect and cushion the lenses.

Based upon the foregoing, it is apparent that a need still exists for an eye-glass holder which insulates and protects eye-glasses particularly in a vehicle. Even the holder of U.S. Pat. No. 5,188,322 to Kinstrey is not appropriate for temporary storage of eye-glasses in vehicles because the eye-glasses are still subject to movement and being dislodged from the holder upon rapid acceleration and deceleration of the vehicle.

SUMMARY OF THE INVENTION

The present invention satisfies the aforementioned requirements for safe eye-glass storage in a vehicle by providing a soft rubber-like environment in a substantially enclosed cylindrical shape into which folded eye-glasses may be placed through a narrow slot for complete physical isolation while they are held in place substantially motionless irrespective of forces from vehicle motion. In a preferred embodiment the material of which the holder is made is neoprene having a 0.25 inch wall thickness. The cylinder is about five inches tall and has a two and three-quarter inch diameter. The cylinder is configured for containment within a standard vehicle cup holder. The top and bottom of the cylinder are enclosed by a two and one-quarter inch circular surface. The bottom enclosure has a water release hole and the top enclosure has a one-half inch by two inch rectangular slot bordered by a plurality of half-inch die cuts. The slot and die cuts cooperate to make it easy to install and remove folded eye-glasses from the holder. They are also configured to enclose and slightly compress the eye-glasses so that they are held firmly without movement while being substantially surrounded by the soft safety of the cylinder. Thus the present invention is the ultimate eye-glasses holder for vehicles.

OBJECTS OF THE INVENTION

It is therefore a principal object of the present invention to provide an eye-glasses holder that is especially suited for temporary storage in the interior compartment of a vehicle.

It is another object of the invention to provide a device for storing folded eye-glasses in a physically isolated and safe environment irrespective of external forces such as acceleration and deceleration of a vehicle.

It is still another object of the invention to provide a cup-shaped eye-glass holder which provides complete protection of the eye-glasses with a rubber-like enclosure.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment of the invention when taken in conjunction with the following drawings in which.

DETAILED DESCRIPTION OF A PREFERRED EMBODIMENT

Figure 1:
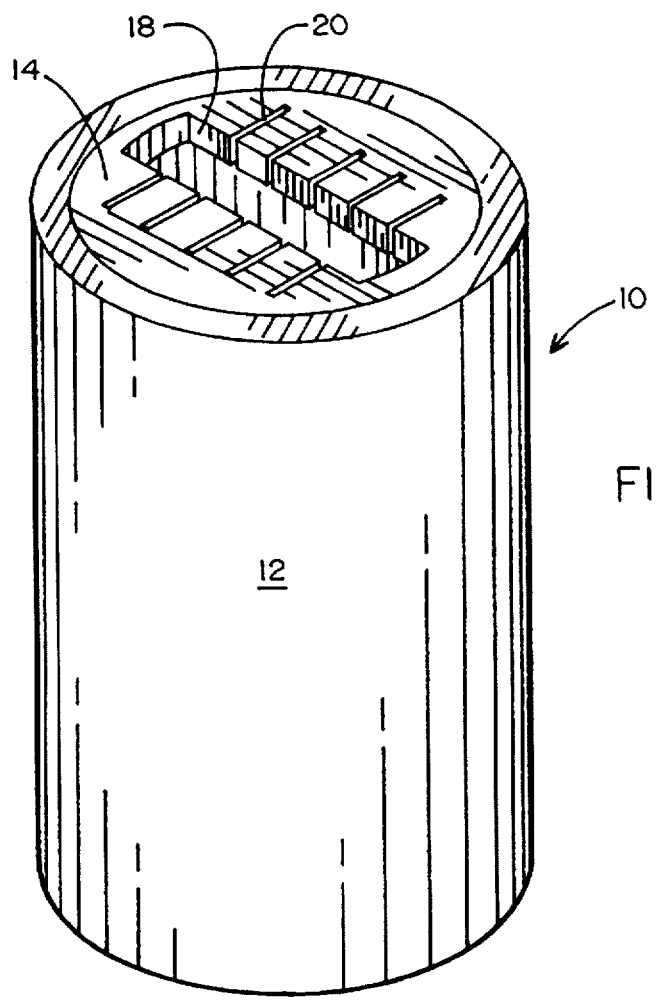
FIG. 1 is a three-dimensional view of a preferred embodiment of the invention.
Figure 2:
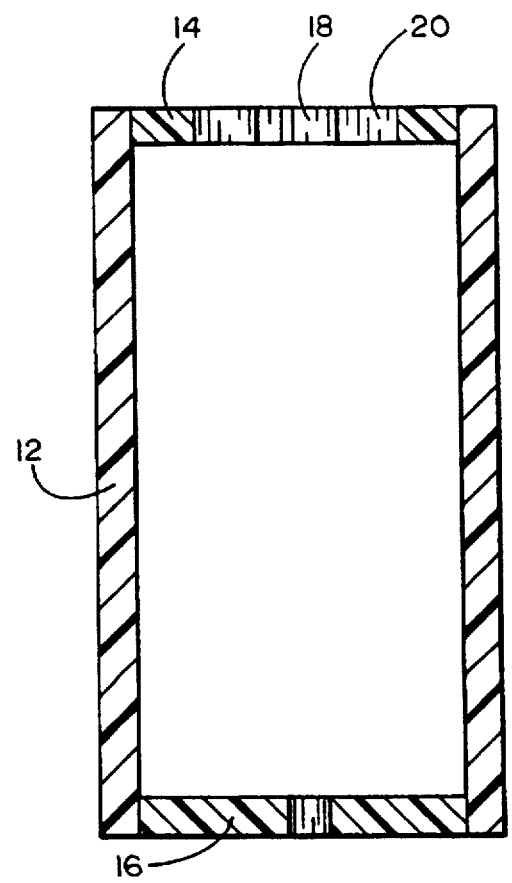
FIG. 2 is a cross-sectional view thereof.
Figure 3:
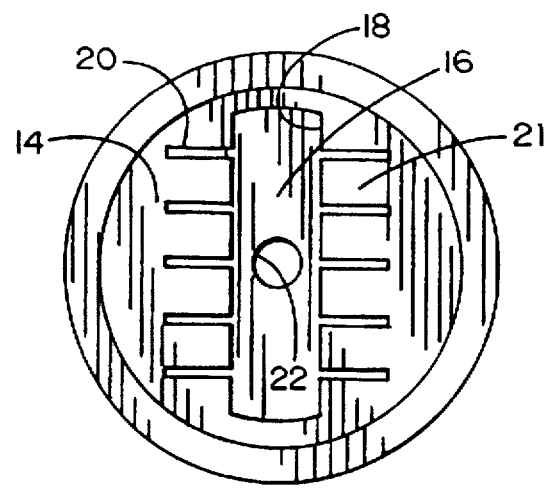
FIG. 3 is a top view thereof.
Figure 4:
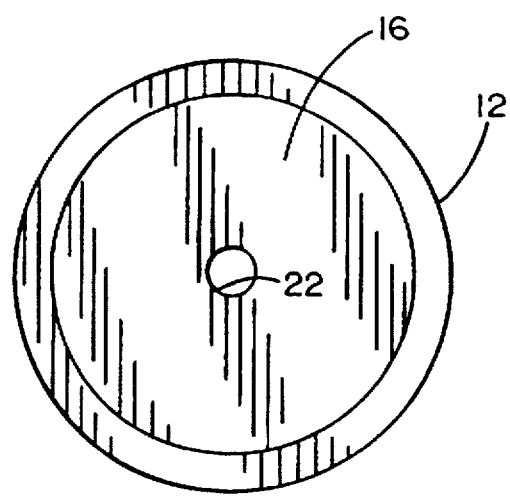
FIG. 4 is a bottom view thereof.

Referring to the accompanying figures, it will be seen that the eye-glass holder 10 of the present invention comprises a cylinder 12 having a top surface 14 and a bottom surface 16. The top surface 14 comprises a substantially rectangular slot 18 and a plurality of straight die cuts 20 forming a plurality of flaps 21. The bottom surface 16 comprises a centrally located drain or weep hole 22.

Figure 5:
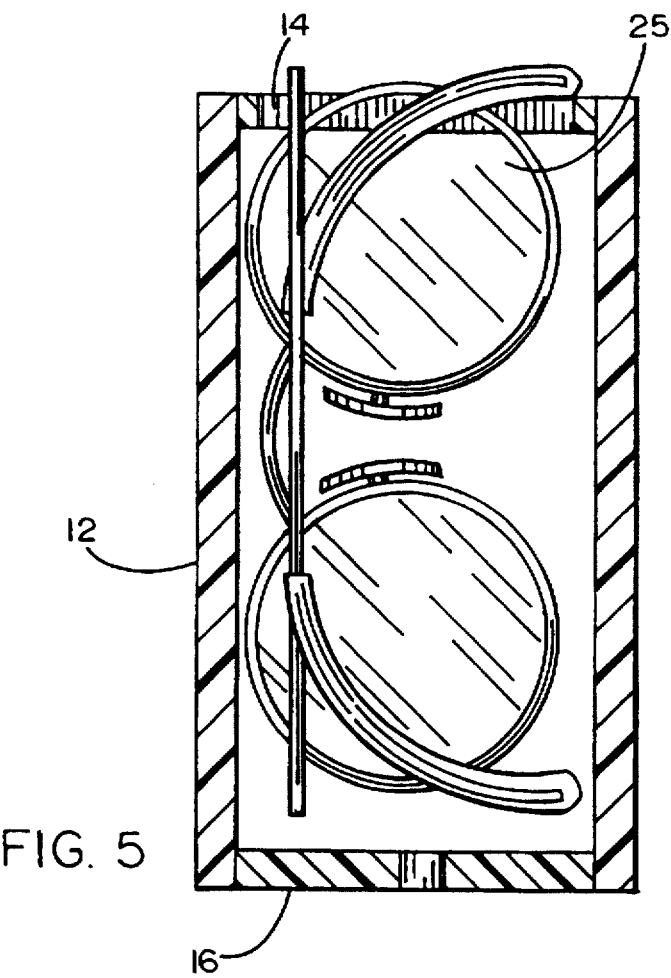
FIG. 5 is a cross-sectional view of the invention including eye-glasses contained therein.
Figure 6:
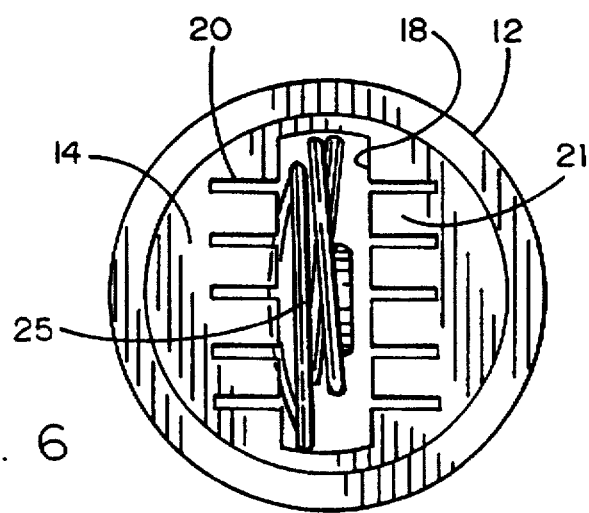
FIG. 6 is a top view of the invention including eye-glasses contained therein.

As shown in FIGS. 5 and 6, a pair of folded eye-glasses 25 is installed in holder 10 by passing them through the slot 18. Flaps 21 bend as necessary to permit easy passage of the eye-glasses 25 into the holder 10 through the slot 18 and then may remain displaced against the eye-glasses to grasp and secure them inside the holder. The eye-glasses 25 are completely surrounded by the neoprene material of which the holder is made.

From the foregoing it can be seen that the preferred embodiment of the invention disclosed herein, meets all of the objects delineated herein. More specifically, what has been disclosed herein comprises a unique eye-glasses holder which completely protects its delicate contents and which is especially suitable for use in a vehicle where it may be optionally secured in a conventional cup holder or the like.

Having thus described an exemplary embodiment of the invention, what is claimed is:

1. An eye-glasses holder comprising:

a unitary, hollow elongated cylinder made of a resilient material and having an access slot at one end for inserting folded eye-glasses;

wherein said access slot comprises a substantially rectangular aperture bordered by a plurality of elongated parallel slits forming at least one flap adjacent said slot between each pair of said slits.

2. The eye-glasses holder recited in claim 1 wherein said hollow cylinder comprises a right circular cylinder.

3. The eye-glasses holder recited in claim 2 wherein said cylinder has a diameter of about 2 ¾ inches.

4. The eye-glasses holder recited in claim 1 wherein said cylinder material comprises neoprene.

5. An eye-glasses holder comprising:

a unitary, substantially enclosed hollow container made of resilient material and having an access slot for inserting folded eye-glasses into the interior of said holder;

wherein said access slot comprises a substantially rectangular aperture bordered by a plurality of elongated parallel slits forming at least one flap adjacent said slot between said slits.

6. The eye-glasses holder recited in claim 5 wherein said container is shaped as an elongated cylinder.

7. The eye-glasses holder recited in claim 6 wherein said cylinder has a diameter of about 2 ¾ inches.

8. The eye-glasses holder recited in claim 7 wherein said cylinder material comprises neoprene.

* * * * *